US012558895B2

(12) United States Patent
Shulaker et al.

(10) Patent No.: US 12,558,895 B2
(45) Date of Patent: Feb. 24, 2026

(54) CONTACT PIN PRINTHEAD FOR MICROARRAY SPOT PRINTING

(71) Applicant: Analog Devices, Inc., Wilmington, MA (US)

(72) Inventors: Max Marcel Shulaker, Cambridge, MA (US); Alicia Ann Coto, Boston, MA (US); Graham E McGrath, Boston, MA (US)

(73) Assignee: Analog Devices, Inc., Wilmington, MA (US)

( * ) Notice: Subject to any disclaimer, the term of this patent is extended or adjusted under 35 U.S.C. 154(b) by 164 days.

(21) Appl. No.: 18/229,610

(22) Filed: Aug. 2, 2023

(65) Prior Publication Data

US 2024/0042760 A1 Feb. 8, 2024

Related U.S. Application Data

(60) Provisional application No. 63/370,224, filed on Aug. 2, 2022.

(51) Int. Cl.
*B41J 2/14* (2006.01)
*B01L 3/00* (2006.01)

(52) U.S. Cl.
CPC .................................... *B41J 2/1433* (2013.01)

(58) Field of Classification Search
CPC .. B41J 2/1433; B41J 2202/19; B41J 2202/20; B41J 2002/14491; B41J 2/145; B01L 3/00; G01R 1/0483; G01R 1/0466
See application file for complete search history.

(56) References Cited

U.S. PATENT DOCUMENTS

2002/0072068 A1* 6/2002 Nakao .................. B01J 19/0046 427/2.11
2002/0173048 A1* 11/2002 Nakazawa ........... B01J 19/0046 436/180
2004/0072365 A1* 4/2004 Rose ..................... B01L 3/0265 436/180

OTHER PUBLICATIONS

"International Application Serial No. PCT/US2023/029348, International Search Report mailed Nov. 29, 2023", 3 pgs.
"International Application Serial No. PCT/US2023/029348, Written Opinion mailed Nov. 29, 2023", 7 pgs.
"International Application Serial No. PCT/US2023/029348, International Preliminary Report on Patentability mailed Feb. 13, 2025", 8 pgs.

* cited by examiner

*Primary Examiner* — Jason S Uhlenhake
(74) *Attorney, Agent, or Firm* — Schwegman Lundberg & Woessner, P.A.

(57) ABSTRACT

A contact pin printhead for microfluidic array spot printing can include a printhead chassis with a plurality of micro-pins insertable within respective sockets in the printhead chassis. An individual micro-pin can include a micro-pin tip that can be individually biased in a distal direction toward a target substrate via an elastic mechanical biaser associated with the micro-pin. An individual micro-pin can deposit fluid carried within a cavity therein and onto a target substrate during physical contact therewith at a micro-pin tip. Also, an individual micro-pin can retain fluid carried within the cavity, without depositing, absent physical contact at the micro-pin tip.

20 Claims, 6 Drawing Sheets

CONTACT PIN PRINTHEAD FOR MICROARRAY SPOT PRINTING

CLAIM OF PRIORITY

This application claims priority to U.S. Provisional Application Ser. No. 63/370,224, filed Aug. 2, 2022, which is hereby incorporated by reference herein in its entirety.

BACKGROUND

Biological spot-arraying can involve printing of a biological material, such as can include biological molecules or cells, onto a surface. For example, several different biological materials can be coated onto a surface and then pressed or stamped with a print head such as to produce an array of the respective biological materials. The array can then be exposed to a target substance such as to perform detection, analysis, classification, or other screening. The array can be screened in vitro, if desired, such as for drug screening or any of a variety of purposes. For example, an array can be used to study or treat a disease, such as cancer, by using the array for screening drugs that can cause cell death or can be capable of blocking an oncogenic pathway, or to study the genetic make up of a cell, for example, to find one or more genes associated with a disease. In addition, a biological material can be stored in an array, such as to allow it to be cultured for a longer period.

For example, a biological material can be deposited on a solid surface in the form of a liquid mixture. A print head can include a stamping surface, such as to stamp or press the biological material onto the solid surface. For example, the biological material can be placed or “spotted” onto the surface one row at a time, or the biological material can be applied as a series of drops, one drop at a time, onto the surface. Such an array, including a plurality of biological materials, can help enable the biological materials to be scanned or imaged. For example, the array of biological materials printed onto the solid surface can be analyzed to determine the concentration of various biological molecules. The biological materials can be analyzed by fluorescence response detection. For example, a laser or other light source can be used to excite a fluorescence response emission in the biological material. Also, the biological material can be stained with various dyes or colored, such as by use of a colorimetric compound, and scanned for one or more color indications. One challenge in producing arrays is that the quality of printing must be uniform and reproducible.

SUMMARY

One way of helping achieve accurate detection or identification of the biological materials can include ensuring that the biological material is deposited to form a uniform layer. Also, it can be important to control the flow of the biological materials through the print head. Therefore, it is also desirable to establish a high degree of control over the deposition or release of the biological material. However, achieving the fine control desired can be difficult because deposition of materials, e.g., from non-contact inkjet printhead, can depend on one or more material characteristics such as viscosity, surface tension, thermal gradients, or the like.

This document describes examples of a contact pin printhead, such as for biological microfluidic array spot printing. Contact pin printheads for producing an array of a biological material can be distinguished from several non-contact microarray spot printing techniques, such as inkjet, pin-type spot printing, laser ablation, or laser micropipette spot printing, which do not use contact between the pin and the target surface. Unlike non-contact spot printing techniques, the contact pin printhead described in this patent application is capable of precise positioning and aligning the liquid micro-volume. This can be helpful for printing biological samples. The pin contact printhead can provide a highly controllable, consistent, and reproducible method for the microscale delivery of liquids onto a solid target substrate.

The printhead can include or use a printhead chassis. The printhead chassis can include a plurality of micro-pin sockets for respectively receiving an individual micro-pin. For example, the printhead can receive a plurality of micro-pins. The micro-pins can be sized and shaped to be at least partially inserted within respective individual sockets in the printhead chassis. Individual ones of the micro-pins in the plurality of micro-pins can be removably couplable within respective micro-pin sockets.

An individual micro-pin can include a micro-pin tip that can be individually biased in a distal direction toward a target substrate. For example, such a bias can be provided via an elastic mechanical biaser associated with the micro-pin. The elastic mechanical biaser can include a bent member including springback. The elastic mechanical biaser can be at least partially housed within the micro-pin. Individual ones of the micro-pins in the plurality of micro-pins can be movable against respective individual elastic mechanical biasers independent of one another.

An individual micro-pin tip can deposit fluid carried within a cavity of the micro-pin onto the target substrate during physical contact therewith. Also, the micro-pin tip can retain fluid carried within the cavity, without depositing, absent physical contact at the tip, e.g., contact with the target substrate. A cavity of an individual micro-pin can deliver a spot, upon physical contact with the micro-pin tip. The spot can have a volume between about 5 picoliters to 300 nanoliters without requiring the cavity to be reloaded. In an example, the plurality of micro-pins can be included such as to be actuated to respectively deposit a plurality of like volume different fluid spots onto the target substrate during physical contact therewith at a plurality of micro-pin tips.

The microarray spot printing apparatus can include a printhead being fluidly connectable to a fluid reservoir via a reservoir fluid-transport conduit. The reservoir fluid-transport conduit can fill, empty, or exchange fluid between the printhead and the reservoir. Also, the microarray spot printing apparatus can include or use a surface for dicing the target substrate into individual dice after print-depositing the fluid on the substrate. An example of a microarray spot printing apparatus can also include an actuator to adjust or exchange a position of at least one of the printhead chassis, the reservoir, or the cutting surface with respect to one another or with respect to the target substrate.

The reservoir can include a plurality of chambers fluidly connected in a series arrangement with respect to at least one of the micro-pins. The reservoir can also include or be coupled to a temperature regulator for regulating a temperature of fluid contained within the reservoir. The microarray spot printing apparatus can include an intermediate chamber fluidly connected between the reservoir and a cavity of an individual micro-pin.

This Summary is intended to provide an overview of the subject matter of the present patent application. It is not intended to provide an exclusive or exhaustive explanation of the invention. The detailed description is included to provide further information about the present patent application.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Pin-printing can be used in arraying of functionalization materials, materials capable of interacting with a biological specimen, on a solid or other surface. Certain non-contact pin-printing approaches can include depositing materials on a target surface by using a dispensing element, such as a pin. For example, ink jet-based technologies such as solenoid and piezo-electric dispensing are considered non-contact technologies, as there is never continuity between dispensing element, liquid and receiving surface. Transfer volume and spot formation are therefore determined by relatively few interacting parameters, which can result in relatively uniform spot morphologies than achievable with contact printing, however at the cost of higher instrument complexity and therefore higher price. Another challenge associated with noncontact pin-printing is that such approaches can have limited ability to produce desired spot morphology in complex or multiplexed arrays.

Alternatively, contact pin-printing involves using pins to directly contact the target surface. A contact pin-printing method can therefore be preferred over non-contact pin-printing when a relatively precise surface morphology is desired or where a small amount of material is to be deposited. A print head design can include a plurality of pins that can be fabricated from a metal material. The pins can be arranged in a pattern to form an array of pins having a corresponding array of biological material placement areas. The pin can include, for example, a needle, a pin of a size or shape to hold or support a biological material, and an attachment for the biological material. A challenge with certain contact pin-printing techniques is that the metal material of an individual pin can wear down relatively quickly due to friction between the metal and the target surface. As a result, the pins can become worn or damaged and the arrayed biological material can be improperly placed as a result. This can produce a less than accurate array and in a lower yield of the biological materials being successfully arrayed. The present inventors have recognized a need for an arraying method and apparatus that can accurately array small amounts of biological materials at desired locations and that can tolerate a relatively large number of such arraying procedures.

Figure 1A:
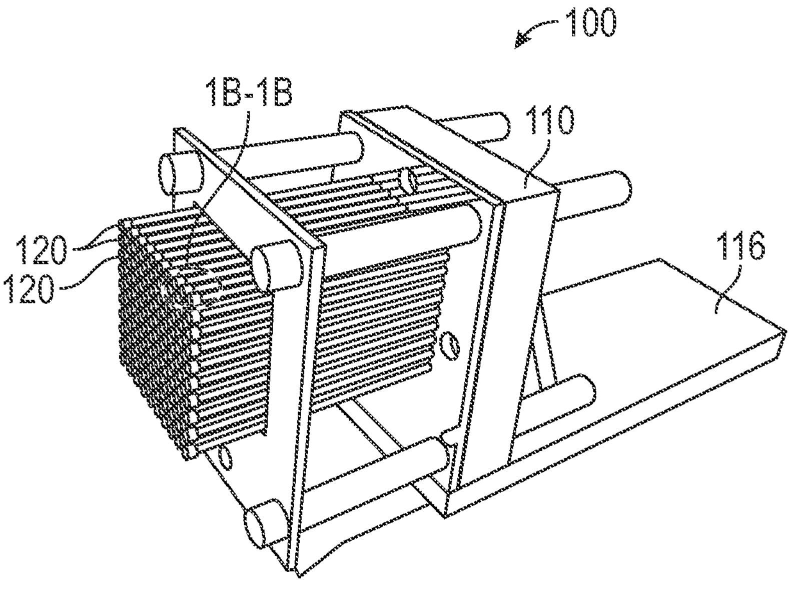
FIG. 1A depicts a perspective view of an example of a contact pin printhead for biological microarray spot printing.
Figure 1B:
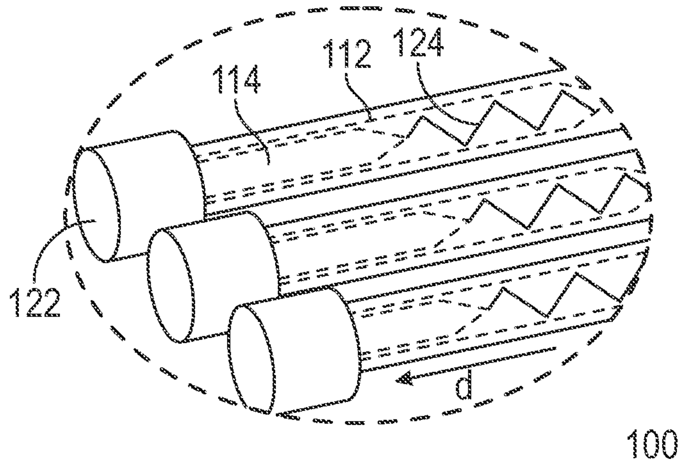
FIG. 1B is a detailed view of an example of a contact pin printhead for biological microarray spot printing.
Figure 1C:
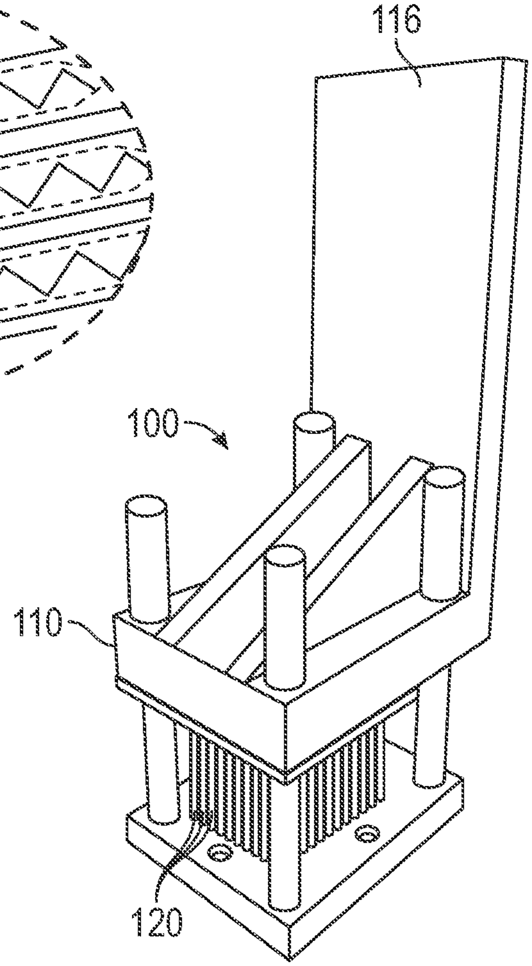
FIG. 1C depicts a perspective view of an example of a contact pin printhead for biological microarray spot printing.

FIG. 1A, FIG. 1B, and FIG. 1C depict a perspective view of an example of a contact pin printhead such as for biological microarray spot printing. In an example, the contact pin printhead 100 can include a printhead chassis 110 for use in depositing fluid via a plurality of micro-pins onto a target substrate during physical contact with the target substrate. In an example, the printhead chassis 110 can include a plurality of micro-pin sockets 112 (as depicted in FIG. 1B) for respectively receiving an individual micro-pin 120. The plurality of micro-pins 120 can be sized and shaped such as to be at least partially insertable within respective individual sockets 112 in the printhead chassis 110.

As depicted in FIG. 1B, an individual micro-pin 120 can include a micro-pin tip 122 that can be individually biased in a distal direction d toward a target substrate via an elastic mechanical biaser 124. For example, the elastic mechanical biaser 124 can include, e.g., an articulated spring, a torsional spring, a leaf spring, an elastomeric member, a flexure, etc., to elastically bias the individual micro-pin 120 distally in the direction d. In an example, the elastic mechanical biaser 124 can include a bent member including springback. Also, the elastic mechanical biaser 124 can be at least partially housed within the micro-pin.

In an example, individual ones of the micro-pins 120 in the plurality of micro-pins 120 can be removably couplable within respective micro-pin sockets. For example, individual ones of the plurality of micro-pins 120 can be fastened to a respective micro-pin socket via a structural solder joint, a welding process, a mechanical fastener, or an adhesive.

An individual micro-pin 120 can also include a cavity 114, and the cavity can be fluidly connected to a reservoir. In an example, the cavity 114 can be loaded or unloaded with fluid from the reservoir. Once loaded with fluid, such as from the reservoir, the cavity 114 of an individual micro-pin 120 can deliver or expel a spot upon contact of the respective micro-pin tip 122 with the target substrate. Herein, a "spot" of fluid can refer to, e.g., a droplet, drop, and/or a puddle of fluid, and the size and location of such a "spot" can be determined based on the relative location, depth, and/or orientation of the optical device relative to the location of the "spot." Fluid spots can include different fluids including, but not limited to, bodily fluids, aqueous or non-aqueous liquids, or solutions. Fluids spots can include a wide range of viscosities and concentrations. Further, fluid spots can include a variety of components and optical, mechanical, or electrical properties such as, but not limited to, a particular color, color saturation, luminosity, opacity, hue, texture, and/or shape, among others. The various properties and characteristics can be influenced by the specific compositions of the fluid, e.g., water and/or ethanol. In an example, the plurality of micro-pins 120 can be included such as to be actuated to respectively release a plurality of like-volume different fluid spots onto the target substrate during physical contact therewith at a plurality of micro-pin tips 122.

In an example the contact pin printhead for microarray spot printing can be coupleable to a gantry or robotic arm such as at or near mounting plate 116. The gantry or robotic arm can provide for robotic or automated arraying and spot printing of one or more microarrays. For example, the printhead chassis 110 can be coupled to the gantry or robotic arm via a mounting arrangement that allows for relative movement between the printhead chassis and gantry, such as a gimbal or flexure mounting, or other mounting arrangement that supports the chassis 110.

Figure 1D:
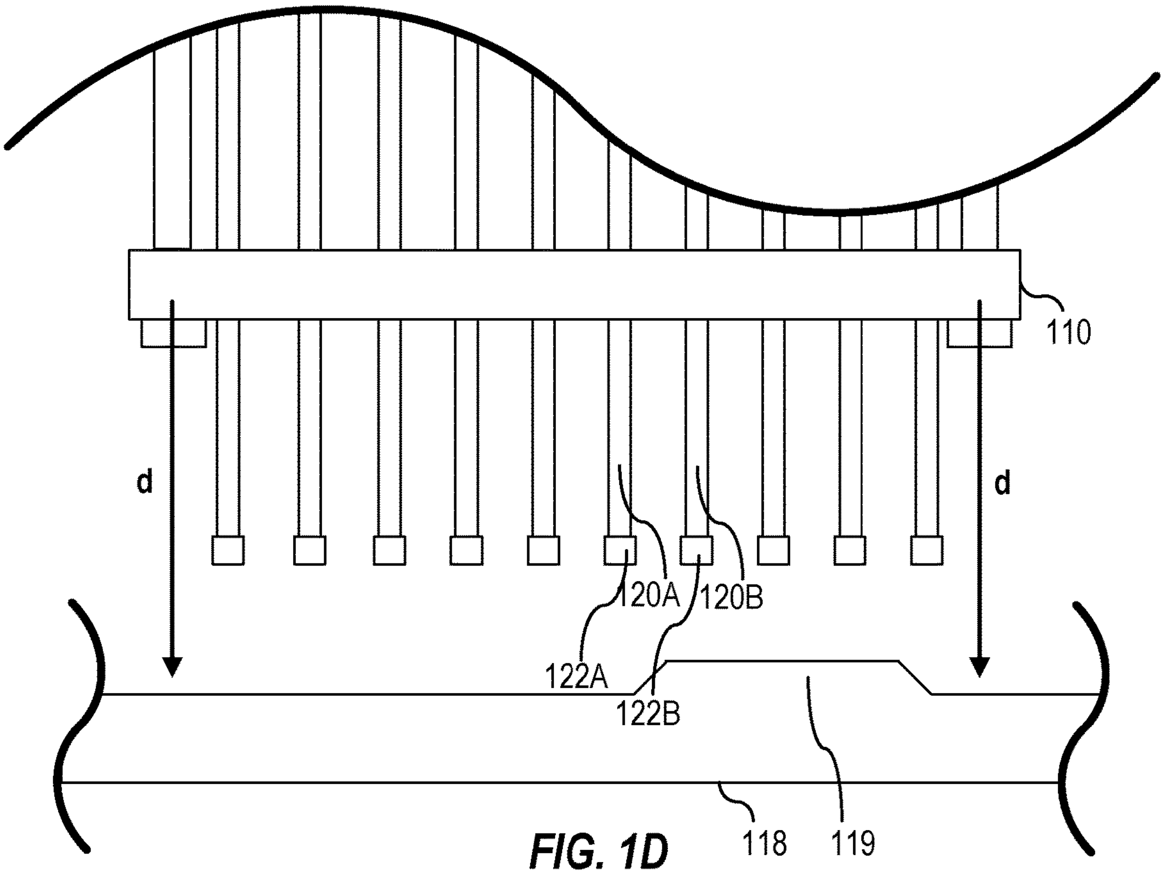
FIG. 1D depicts an action of an example of a contact pin printhead.
Figure 1E:
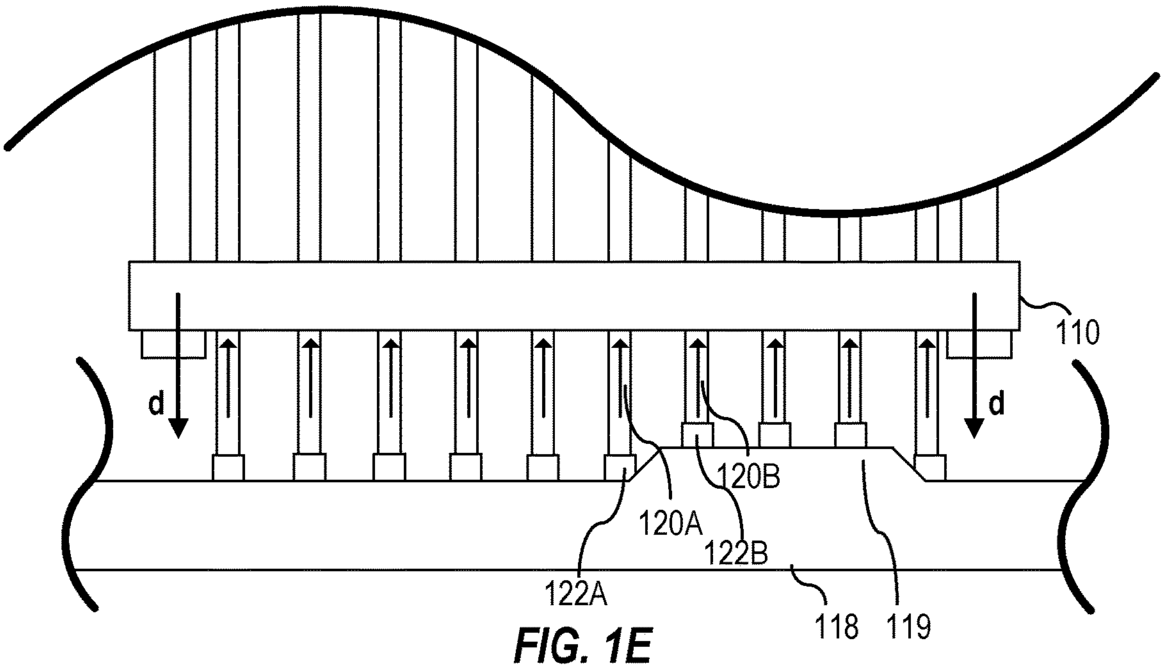
FIG. 1E depicts an action of an example of a contact pin printhead.

FIG. 1D and FIG. 1E depict an action of an example of a contact pin printhead. In an example, individual ones of the micro-pins 120 in the plurality of micro-pins 120 can be movable against respective individual elastic mechanical biasers independent of one another. As depicted between FIG. 1D and FIG. 1E, when the printhead chassis 110 is moved in the direction d towards a target substrate 118, individual micro-pins 120 can be moved against their respective biases upon contact with the target substrate 118 at respective micro-pin tips 122. In an example, the surface of the target substrate 118 can have a non-planar surface, such as including a projection 119. As depicted in FIG. 1E, the plurality of individual micro-pins 120 can conform to a surface of the target substrate 118, including the projection 119, due to the independently biased action of individual micro-pins 120. For example, a first micro-pin 120A and a second micro-pin 120B can be included in the plurality of micro-pins 120. The first and second micro-pins 120A and 120B can be similarly biased, via respective elastic mechanical biasers, while no contact is present at respective micro-pin tips 122A and 122B. When the printhead chassis 110 is moved in the direction d towards the target substrate 118 and at least one of the respective micro-pin tips 122A and 122B contact the target substrate 118, the contacted micro-pin tip 122A or 122B can move against its respective bias independent from other micro-pin tips and their respective biases. For example, in an intermediate position between FIG. 1D and FIG. 1E, the second micro-pin tip 122B can contact the target substrate 118 such that the second micro-pin 120B is moved against its bias while the first micro-pin 120A (absent contact at micro-pin tip 122A) remains fully biased. As depicted in FIG. 1E, first and second micro-pins 120A and 120B can be moved at different displacements against their respective biases based on the surface of the target substrate 118. Such an independent biasing action amongst the plurality of micro-pins can help the printhead apply near-even pressure at the respective plurality of micro-pin tips, even in situations where the printhead chassis 110 is moved in the direction d at a slightly non-parallel orientation with respect to the target substrate 118.

Figure 2A:
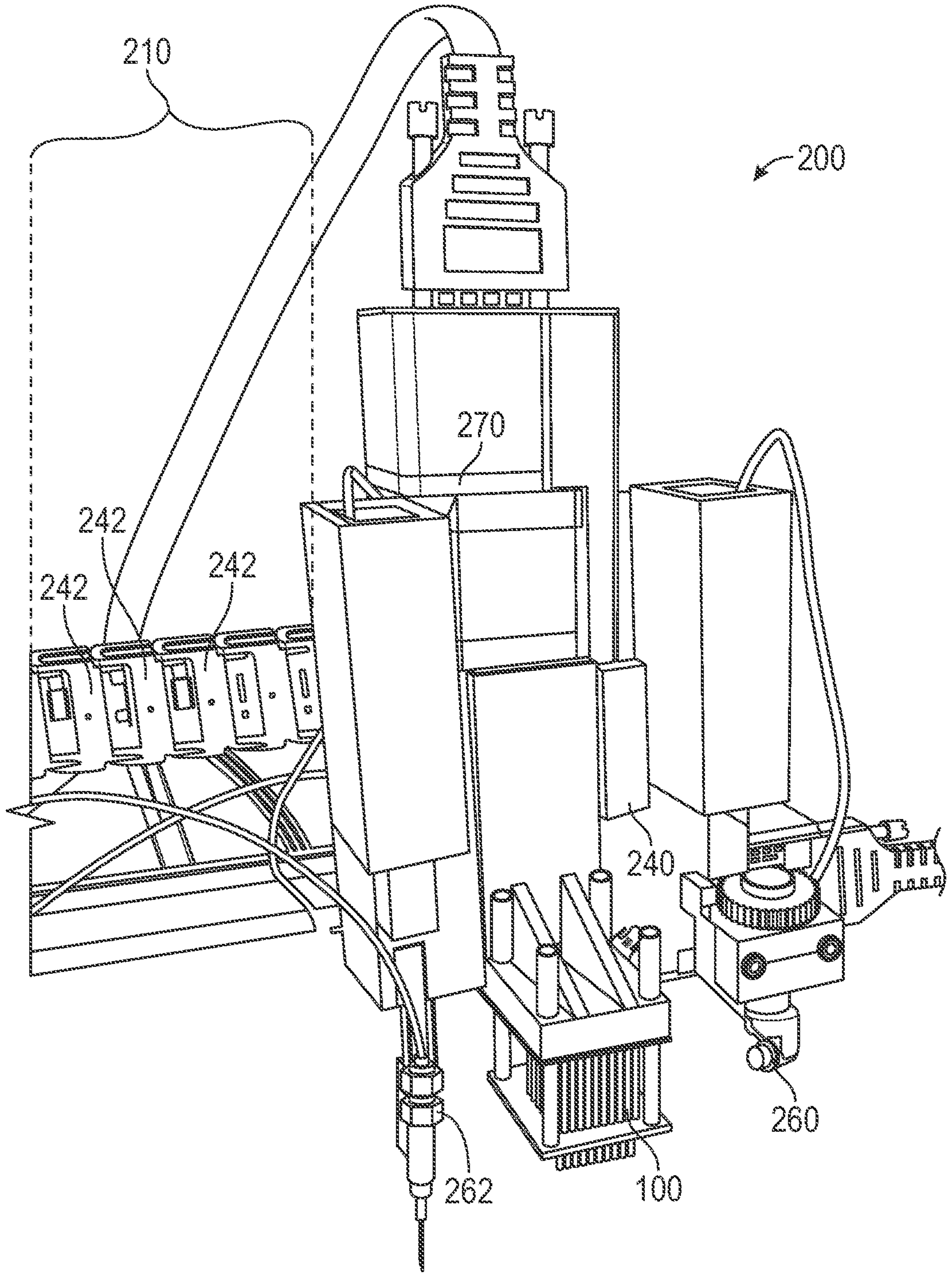
FIG. 2A depicts an example of a microarray spot-printing apparatus including a contact pin printhead.
Figure 2B:
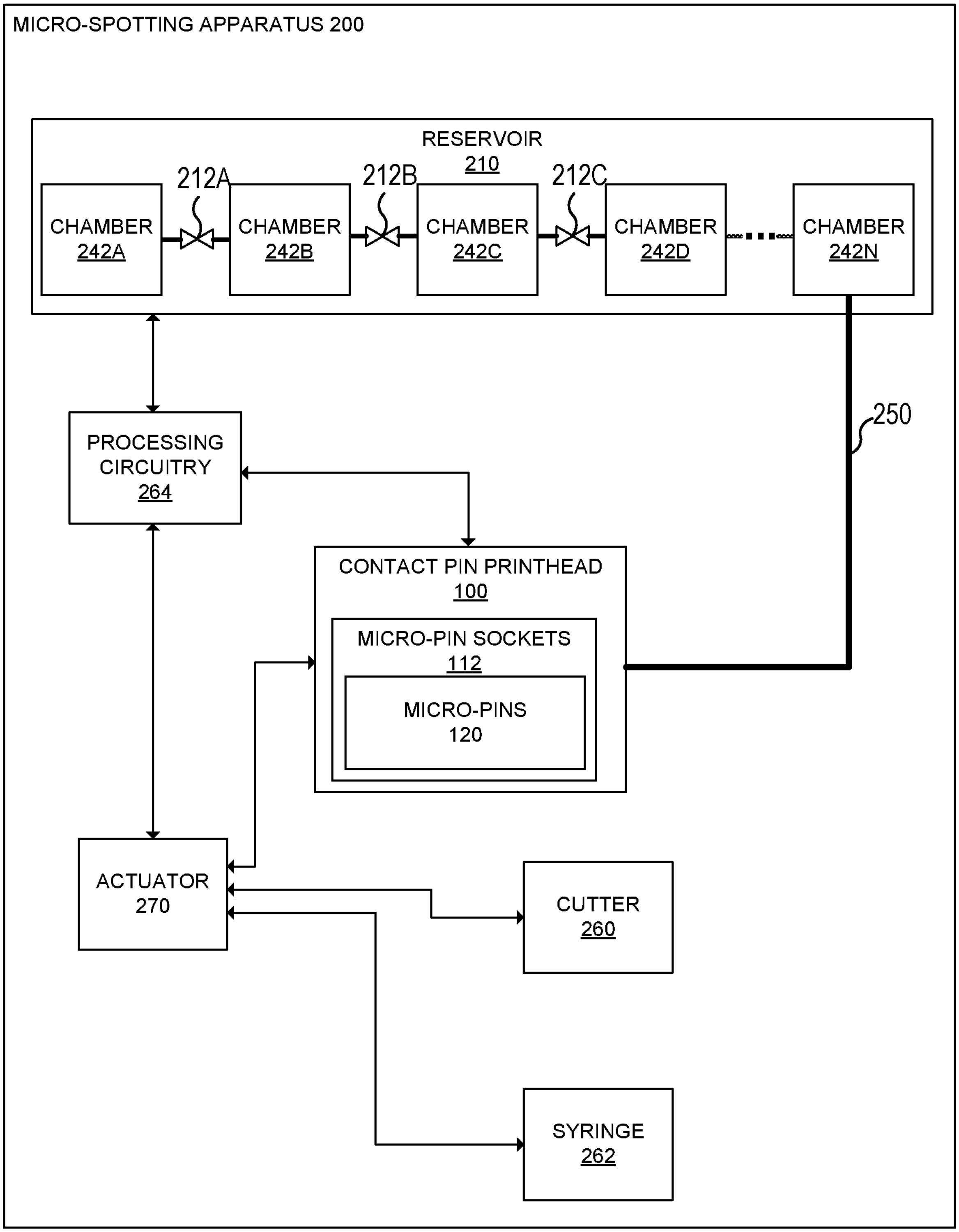
FIG. 2B is a block diagram that further describes an example of a microarray spot-printing apparatus.

FIG. 2A depicts an example of a microarray spot-printing apparatus including a contact pin printhead. In an example, the microarray spot-printing apparatus 200 can include a reservoir 210. The contact pin printhead 100 can also include a reservoir fluid-transport conduit 250, included such as to be coupled to the reservoir 210 to fill, empty, or exchange fluid in the reservoir 210. The contact pin printhead 100 can also include a cutting surface 260, for dicing the target substrate into individual dice after print-depositing the fluid on the target substrate. The contact pin printhead 100 can also include an actuator 270 to adjust or exchange a position of at least one of the printhead chassis 110, the reservoir 210, or the cutting surface 260 with respect to at least one other of the printhead chassis 110, the reservoir 210, or the cutting surface 260 or with respect to the target substrate. For example, the actuator 270 can include one or more motors, such as to raise and lower, or to translate in the x, y, and/or z directions. The actuator 270 can also include a drive system to actuate one or more gears, bearings, or other mechanical components of the actuator 270 to cause an adjustment or exchange of position. The contact pin printhead 100 can also include an actuator 270 to adjust or exchange a position of at least one of the printhead chassis 110, the reservoir 210, or the cutting surface 260 with respect to at least one other of the printhead chassis 110, the reservoir 210, or the cutting surface 260 or with respect to the target substrate. For example, the actuator 270 can include a linear actuator, such as a linear motor or a piezo motor, an arc motor, or a rotary actuator, such as a torque motor. The actuator 270 can also include a rotary actuator, such as a fluidic driver, a rotary motor, a gearhead motor, an electrothermal transducer, or an ultrasonic motor. The actuator can be communicatively coupled to processing circuitry 264 (as depicted in FIG. 2B) such as to adjust the position of at least one of the printhead chassis 110, the reservoir 210, or the cutting surface 260.

The actuator 270 can also be communicatively coupled to an imaging system 240 to adjust or exchange the position of the contact pin printhead 100 with respect to the target substrate, either by imaging the target substrate, or by observing the position of the contact pin printhead 100 and the reservoir 210 and/or the cutting surface 260 with respect to the target substrate. In an example, the imaging system 240 can include at least one sensor, such as for producing a feedback signal. In an example, the imaging system 240 can include one or more cameras, such as to image the target substrate. In an example, the cameras can include one or more of a laser triangulation camera, a line-scan camera, a CCD camera, a CMOS camera, a CMOS detector, a charge coupled device (CCD) camera, a video camera, or a light detector, such as a photodetector, light emitting diode (LED), and/or phototransistor. The cameras can also be used to image the contact pin printhead 100 for alignment of the contact pin printhead 100 with respect to the target substrate. Here, the imaging system 240 can be communicatively coupled to processing circuitry 264 for adjusting a position of the printhead chassis 110, the reservoir 210, or the cutting surface 260 via the actuator 270 based on the feedback signal or the image data from the camera.

The microarray spot-printing apparatus 200 can also include or use an automatic syringe 262 which can be coupled to the reservoir 210. In microarray spot-printing using a contact printhead 100, the automatic syringe 262 can be included with the reservoir 210 to dispense small volumes of fluid onto the target substrate, if desired. The syringe 262 can be used to dispense liquid droplets or solid particulates on a target substrate, such as a flat glass slide having probe sets to be tested for hybridization.

The reservoir 210 can include a plurality of chambers 242 that can be fluidly connected in a series arrangement with respect to at least one of the micro-pins 120. The chambers 242 can contain flowable media such as liquids or gels and can include a variety of shapes, sizes and geometries. The chambers 242 can be cylindrical, prismatic, or have a cross-sectional shape other than circular.

FIG. 2B is a block diagram that further describes an example of a microarray spot-printing apparatus. The microarray spot-printing apparatus can include a reservoir 210. The contact pin printhead 100 can also include a reservoir fluid-transport conduit 250, such as to be coupled to the reservoir 210 to fill, empty, or exchange fluid in the reservoir 210. For example, a reservoir fluid-transport conduit 250 can comprise a flexible tube or hose that provides fluid-transport conduit to fluid in the reservoir 210. The reservoir fluid-transport conduit 250 can further include a flow regulator that provides a stable flow of fluid in the reservoir fluid-transport conduit 250. A regulator, such as a flow regulator, can be part of or integral to the reservoir fluid-transport conduit 250. The flow regulator can include a piston or diaphragm coupled to an actuator that provides a stable flow of fluid in the reservoir fluid-transport conduit 250. The regulator can be coupled to a fluid source, such as a pump, that provides the fluid source to the reservoir fluid-transport conduit 250. In an example, the flow regulator device can include a diaphragm that regulates the flow of fluid into and out of the reservoir fluid-transport conduit 250.

The reservoir 210 can include or can be coupled to a temperature regulator included such as to regulate a temperature of fluid contained within the reservoir 210. The temperature regulator can include a temperature sensor circuit that measures a temperature of fluid contained within the reservoir 210, and a temperature regulator circuit that regulates a heating element based on a temperature detected by the temperature sensor circuit. The temperature regulator can be a self-regulating temperature regulator that includes thermistor circuitry that regulates a temperature of the fluid based on a temperature of the fluid detected. In an example, the temperature regulator can be temperature regulator circuitry coupled to independent or remote thermistor sensor circuitry, and which together control a heating element. In an example, the reservoir 210 also includes at least one actuatable cover.

Fluid communication between at least two of the plurality of chambers 242 can be controllable by at least one actuatable valve 212. The micro-spot printing apparatus 200 can include a plurality of independently actuatable valves 212 and an individual valve 212 of the plurality of actuatable valves can be arranged such as to control fluid communication between at least two of the plurality of chambers 242. The valve 212 can be an individual one of a plurality of valves 212 in an arrangement for independent filling, emptying, or exchanging of fluid between individual fluid chambers within the series arrangement. The independently actuatable valves 212 can be arranged such as to independently provide fluid to or from the individual fluid chambers of the series arrangement of chambers 242 and can be arranged such as to maintain separate fluid flows. The independently actuatable valves 212 can be individually and independently operated by a valve actuator, such as by an electromagnetic coil, via an electromagnet and an individual pole of the coil.

The pressure of an individual chamber of the plurality of chambers 242 can be manipulable or independently controllable. For example, a first chamber 242A of the plurality of chambers 242 can be pressurized fluidly, such as to increase a flow rate of the fluid to the second chamber 242B of the plurality of chambers 242.

The plurality of chambers 242 can include different fluid compositions from one another. In an example, first and second chambers 242A and 242B can provide distinct liquid volumes and can be filled independently from each other. The first and second chambers 242A and 242B can include portions of separate respective internal portions of separate fluid lines that can be filled separately. The second chamber can be sized to create a flow imbalance in the first chamber, resulting in the second chamber receiving a greater amount of fluid, or pressure, than the first chamber. An individual valve of the plurality of valves 212 can facilitate fluid mixing between at least two of the chambers 242. For example, the valve 212A can permit a volume of fluid contained in the first chamber 242A to mix with a volume of fluid contained in the second chamber 242A by communicating the chambers a passage. Likewise, the valve 212B can permit a volume of fluid contained in second chamber 242B to mix with a volume of fluid contained in the third chamber 242C by communicating the chambers via a passage. In this manner, a desired composition of the intermediate fluid can be prepared.

The contact pin printhead 100 can also include a cutting surface 260, for dicing the target substrate into individual dice after print-depositing the fluid on the target substrate. For example, when the printing process is completed and the wafer is diced, the cutting surface 260 can be utilized to cut the target substrate into the plurality of individual dice, which can then be further processed to be used for any desired application. The cutting surface 260 can be included in, e.g., a cutting wheel, along with other cutting members such as a saw blade or the like.

The contact pin printhead 100 can also include an actuator 270 to adjust or exchange a position of at least one of the printhead chassis 110, the reservoir 210, or the cutting surface 260 with respect to at least one other of the printhead chassis 110, the reservoir 210, or the cutting surface 260 or with respect to the target substrate. For example, the actuator 270 can be a linear actuator, such as a linear motor or a piezo motor, an arc motor, or a rotary actuator, such as a torque motor. The actuator 270 can also be a rotary actuator, such as a fluidic driver, a rotary motor, a gearhead motor, an electrothermal transducer, or an ultrasonic motor. The actuator can be communicatively coupled to processing circuitry 264 to adjust the position of at least one of the printhead chassis 110, the reservoir 210, or the cutting surface 260. The processing circuitry can be mounted in a card, substrate, or other circuit board that is electrically coupled to the contact pin printhead 100 and configured to control operation of the contact pin printhead 100 via the actuator 270. The processing circuitry can be integrated in the contact pin printhead 100. Further, although shown as including a single actuator 270, multiple actuators can be used to adjust the position of at least one of the printhead chassis 110, the reservoir 210, or the cutting surface 260.

Figure 3:
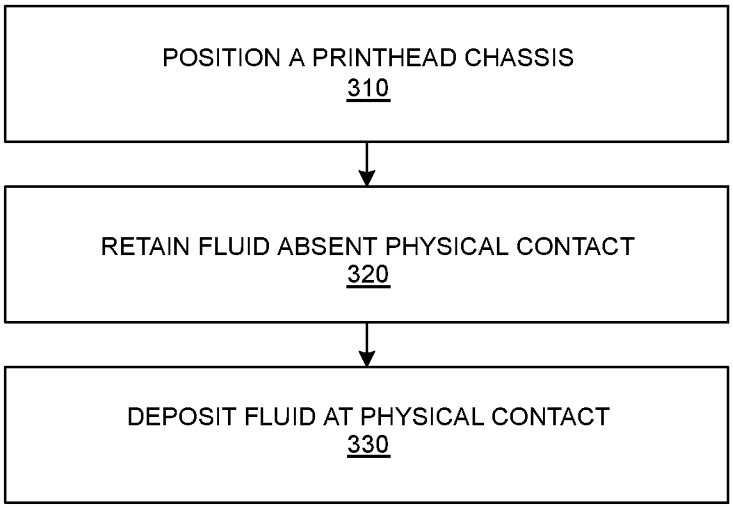
FIG. 3 is a flowchart that describes a method for using a contact pin printhead for biological microarray spot printing.

FIG. 3 is a flowchart that describes a method for using a contact pin printhead for biological microarray spot printing. In an example, at 310, the method can include positioning a printhead chassis with respect to the target substrate for spot printing thereon, the printhead chassis including a plurality of micro-pin sockets including a plurality of micro-pins respectively insertable therein. For example, at least one of the micro-pins of the printhead chassis can be replaced within an individual micro-pin socket of the printhead chassis.

At 320, the method can include retaining fluid carried within a cavity of an individual micro-pin, without depositing, absent external physical contact at a micro-pin tip and when the respective micro-pin tip can be individually biased in a distal direction towards the target substrate via an elastic mechanical biaser associated with the micro-pin.

At 330, the method can include depositing fluid carried within a cavity of an individual micro-pin onto a target substrate during physical contact therewith at a micro-pin tip and when the respective micro-pin tip can be moved against its respective elastic mechanical biaser.

Figure 4:
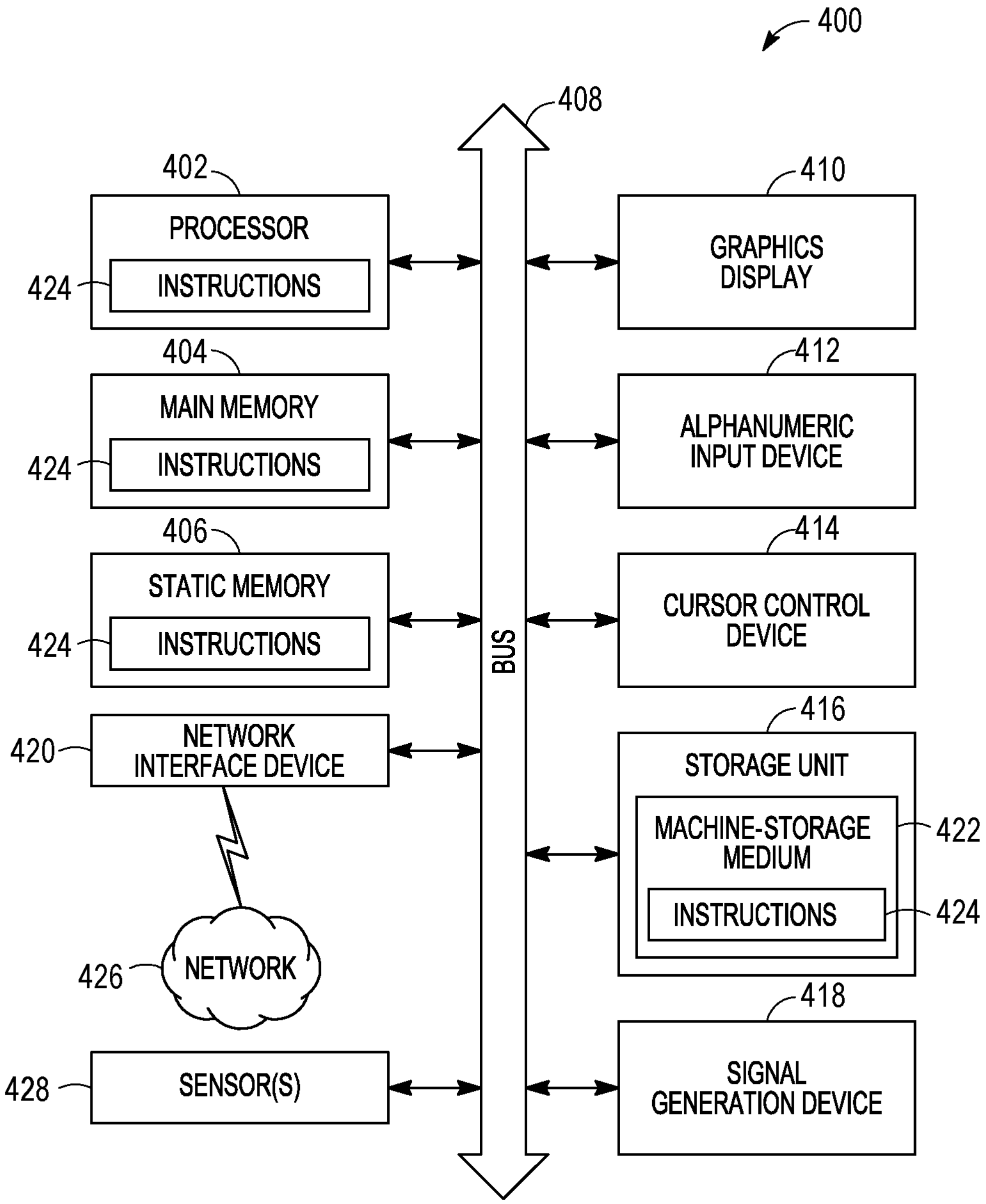
FIG. 4 is a block diagram illustrating components of an example of a machine.

FIG. 4 is a block diagram illustrating components of a machine 400 able to read instructions 424 from a machine-storage medium 422 (e.g., a non-transitory machine-storage medium, a machine-storage medium, a computer-storage medium, or any suitable combination thereof) and perform any one or more of the methodologies discussed herein, in whole or in part. Specifically, FIG. 4 shows the machine 400 including a computer system (e.g., a computer) within which the instructions 424 (e.g., software, a program, an application, an applet, an app, or other executable code) for causing the machine 400 to perform any one or more of the methodologies discussed herein can be executed, in whole or in part. For example, the instructions 424 can be processor executable instructions that, when executed by a processor of the machine 400, cause the machine 400 to perform the operations outlined above.

The machine 400 can operate as a standalone device or can be communicatively coupled (e.g., networked) to one or more other machines. In a networked deployment, the machine 400 can operate in the capacity of a server machine or a client machine in a server-client network environment, or as a peer machine in a distributed (e.g., peer-to-peer) network environment. The machine 400 can be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 can contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 can be configurable to execute one or more modules (e.g., software modules) described herein.

The machine 400 can further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 can also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, any suitable combination thereof, or any other suitable signal generation device), and a network interface device 420.

The storage unit 416 includes the machine-storage medium 422 (e.g., a tangible and non-transitory machine-storage medium) on which are stored the instructions 424, embodying any one or more of the methodologies or functions described herein. The instructions 424 can also reside, completely or at least partially, within the main memory 404, within the processor 402 (e.g., within the processor's cache memory), or both, before or during execution thereof by the machine 400. Accordingly, the main memory 404 and the processor 402 can be considered machine-storage media (e.g., tangible and non-transitory machine-storage media). The instructions 424 can be transmitted or received over the network 426 via the network interface device 420. For example, the network interface device 420 can communicate the instructions 424 using any one or more transfer protocols (e.g., Hypertext Transfer Protocol (HTTP)).

In some example embodiments, the machine 400 can be a portable computing device, such as a smart phone or tablet computer, and have one or more additional input components (e.g., sensors 428 or gauges). Examples of the additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components can be accessible and available for use by any of the modules described herein.

Executable Instructions and Machine-Storage Medium

The various memories (i.e., 404, 406, and/or memory of the processor(s) 402) and/or storage unit 416 can store one or more sets of instructions and data structures (e.g., software) 424 embodying or utilized by any one or more of the methodologies or functions described herein. These instructions, when executed by processor(s) 402 cause various operations to implement the disclosed embodiments.

As used herein, the terms "machine-storage medium," "device-storage medium," "computer-storage medium" (referred to collectively as "machine-storage medium 422") mean the same thing and can be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 422 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and can be used interchangeably in this disclosure. The terms are defined to include both machine-storage media and signal media. Thus, the terms include both storage devices/media and carrier waves/modulated data signals.

The following, non-limiting examples, detail certain aspects of the present subject matter to solve the challenges and provide the benefits discussed herein, among others.

The above Detailed Description can include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A contact pin printhead for microfluidic array spot printing, the printhead comprising:

a printhead chassis including a plurality of micro-pin sockets for respectively receiving an individual micro-pin; and a plurality of micro-pins, sized and shaped to be at least partially inserted within respective individual sockets in the printhead chassis, wherein an individual micro-pin of the plurality of micro-pins includes:

an internal cavity configured to carry fluid; and a micro-pin tip that is individually biased, with respect to other micro-pin tips of the plurality of micro-pins, in a distal direction toward a target substrate via an elastic mechanical biaser associated with the individual micro-pin, and configured to:

deposit fluid carried within the internal cavity of the individual micro-pin onto a target substrate during physical contact therewith at the micro-pin tip; and retain fluid carried within the internal cavity, without depositing, absent physical contact at the micro-pin tip.

2. The printhead of claim 1, wherein individual ones of the micro-pins in the plurality of micro-pins are removably couplable within respective micro-pin sockets.

3. The printhead of claim 1, wherein the elastic mechanical biaser includes a bent member including springback and the elastic mechanical biaser is at least partially housed within the micro-pin.

4. The printhead of claim 1, wherein the internal cavity of an individual micro-pin of the plurality of micro-pins is fluidly connected to a reservoir and configured to be loaded with fluid from the reservoir.

5. The printhead of claim 1, wherein individual ones of the micro-pins in the plurality of micro-pins are movable against respective individual elastic mechanical biasers independent of one another.

6. The printhead of claim 1, wherein the internal cavity of an individual micro-pin is configured to deliver a spot having a volume between 300 nanoliters and 5 picoliters without the internal cavity being reloaded.

7. The printhead of claim 1, wherein the plurality of micro-pins are configured to be actuated to respectively deposit a plurality of like volume different fluid spots onto a target substrate during physical contact therewith at a plurality of micro-pin tips.

8. The printhead of claim 1, wherein individual ones of the plurality of micro-pins are configured to be respectively fastened to a respective micro-pin socket via a structural solder joint.

9. The printhead of claim 1, further comprising:

a reservoir;

a reservoir fluid-transport conduit, configured to be coupled to the reservoir to fill, empty, or exchange fluid in the reservoir;

a cutting surface, for dicing the target substrate into individual dice after print-depositing the fluid on the target substrate; and an actuator to adjust or exchange a position of at least one of the printhead chassis, the reservoir, or the cutting surface with respect to at least one other of the printhead chassis, the reservoir, or the cutting surface or with respect to the target substrate.

10. The printhead of claim 9, wherein the reservoir includes a plurality of chambers fluidly connected in a series arrangement with respect to at least one of the micro-pins.

11. The printhead of claim 9, wherein the reservoir includes an actuatable cover.

12. The printhead of claim 9, wherein the reservoir includes or is coupled to a temperature regulator configured to regulate a temperature of fluid contained within the reservoir.

13. The printhead of claim 9, further comprising an intermediate chamber fluidly connected between the reservoir and a cavity of an individual micro-pin.

14. A micro-spotting apparatus comprising:

a reservoir;

a contact pin printhead including:

a printhead chassis including a plurality of micro-pin sockets for respectively receiving an individual micro-pin; and a plurality of micro-pins, individual ones of the plurality of micro-pins being sized and shaped to be inserted within respective individual sockets in the printhead chassis, wherein an individual micro-pin of the plurality of micro-pins includes:

an internal cavity configured to be loaded with fluid; and a micro-pin tip that is individually biased, with respect to other micro-pin tips of the plurality of micro-pins, in a distal direction towards a target substrate via an elastic mechanical biaser associated with the individual micro-pin, and wherein the individual micro-pin is configured to:

deposit fluid carried within a cavity of the individual micro-pin onto a target substrate during physical contact therewith at a micro-pin tip; and retain fluid carried within the cavity, without depositing, absent physical contact at the micro-pin tip; and a plurality of intermediate chambers fluidly connected in a series arrangement between the reservoir and a cavity of an individual micro-pin, wherein fluid communication between at least two of the plurality of intermediate chambers is controllable by at least one actuatable valve.

15. The apparatus of claim 14, further comprising a plurality of independently actuatable valves, an individual valve of the plurality of independently actuatable valves arranged to control fluid communication between at least two of the plurality of intermediate chambers to control fluid communication therebetween.

16. The apparatus of claim 14, further comprising an independently actuatable valve located between at least two of the plurality of intermediate chambers.

17. The apparatus of claim 16, wherein:

an individual chamber of the plurality of intermediate chambers defines an individual fluid stage within the series arrangement; and the independently actuatable valve is an individual one of a plurality of valves in a configuration for independent filling, emptying, or exchanging of fluid between individual fluid chambers within the series arrangement.

18. A method for microfluidic array spot printing onto a target substrate, the method comprising:

positioning a printhead chassis with respect to the target substrate for spot printing thereon, the printhead chassis including a plurality of micro-pin sockets including a plurality of micro-pins respectively insertable therein;

retaining fluid carried within an internal cavity of an individual micro-pin, without depositing, absent external physical contact at a micro-pin tip and when the respective micro-pin tip is individually biased in a distal direction towards the target substrate via an elastic mechanical biaser associated with the individual micro-pin; and depositing fluid carried within the internal cavity of an individual micro-pin onto a target substrate during physical contact therewith at a micro-pin tip and when the respective micro-pin tip is moved against its respective elastic mechanical biaser.

19. The method of claim 18, further comprising loading the internal cavity of the individual micro-pin with fluid from an external reservoir fluidly connected via a fluid-transport conduit to the cavity of an individual micro-pin of the plurality of micro-pins to an external reservoir via a fluid-transport conduit.

20. The method of claim 19, further comprising:

operating at least one actuatable valve to control fluid communication between at least two chambers of a plurality of chambers fluidly connected in a series arrangement; and loading the internal cavity of the individual micro-pin using the plurality of chambers fluidly connected in a series arrangement with respect to at least one of the plurality of micro-pins.

* * * * *